US008914226B2

(12) United States Patent
Miyajima et al.

(10) Patent No.: US 8,914,226 B2
(45) Date of Patent: Dec. 16, 2014

(54) TRAFFIC INFORMATION CREATING DEVICE, TRAFFIC INFORMATION CREATING METHOD AND PROGRAM

(71) Applicant: Aisin AW Co., Ltd., Anjo (JP)

(72) Inventors: Takayuki Miyajima, Anjo (JP); Satoshi Hirano, Okazaki (JP); Kiyokazu Okada, Miyoshi (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/789,200

(22) Filed: Mar. 7, 2013

(65) Prior Publication Data

US 2013/0253811 A1 Sep. 26, 2013

(30) Foreign Application Priority Data

Mar. 21, 2012 (JP) ................................ 2012-063212

(51) Int. Cl.

| | |
|---|---|
| ***G01C 1/00*** | (2006.01) |
| ***G08G 1/01*** | (2006.01) |
| ***G08G 1/00*** | (2006.01) |

(52) U.S. Cl.

CPC ................ *G08G 1/00* (2013.01); *G08G 1/0133* (2013.01); *G08G 1/0112* (2013.01)

USPC ........... 701/118; 701/117; 701/119; 701/517; 340/917; 340/933; 340/988; 340/992; 340/995.13

(58) Field of Classification Search

CPC .................................. G01C 21/34; G06F 7/00

USPC ............. 701/1, 117–123, 300–302, 400–409, 701/532; 340/994, 995.1, 995.13, 995.14; 700/66

See application file for complete search history.

(56) References Cited

U.S. PATENT DOCUMENTS

| | | | | |
|---|---|---|---|---|
| 6,650,948 | B1 * | 11/2003 | Atkinson et al. | 700/66 |
| 8,103,437 | B2 * | 1/2012 | Nagase et al. | 701/118 |
| 8,433,504 | B2 * | 4/2013 | Hayashida et al. | 701/118 |

(Continued)

FOREIGN PATENT DOCUMENTS

| | | | |
|---|---|---|---|
| EP | 2 006 818 | A1 | 12/2008 |
| EP | 2 287 821 | A1 | 2/2011 |
| JP | A-2008-234162 | | 10/2008 |

OTHER PUBLICATIONS

Jul. 31, 2013 European Search Report issued in Application No. EP 13 15 8242.

*Primary Examiner* — Thomas Tarcza
*Assistant Examiner* — Tyler J Lee
(74) *Attorney, Agent, or Firm* — Oliff PLC

(57) ABSTRACT

Devices, methods, and programs access map information including link information related to links that constitute a road, acquire a current location of a vehicle at unit time intervals, and acquire traffic information, which includes a distributed traffic congestion level of each link at predetermined time intervals. Each time the vehicle exits a link, the devices, methods, and programs sequentially store the exited link in an exited link train based on the map information. If the traffic information has been received, the devices, methods, and program store the distributed traffic congestion level included in the received traffic information as a traffic congestion level in association with a portion of the exited link train within a range from the current location at a received time point when the traffic information has been received to a location that is a predetermined distance behind the current location at the received time point.

12 Claims, 8 Drawing Sheets

(56) References Cited

U.S. PATENT DOCUMENTS

| | | | | |
|---|---|---|---|---|
| 2003/0125874 | A1* | 7/2003 | Fushiki et al. | 701/211 |
| 2005/0093720 | A1* | 5/2005 | Yamane et al. | 340/995.13 |
| 2005/0143906 | A1* | 6/2005 | Ishikawa et al. | 701/200 |
| 2005/0206534 | A1* | 9/2005 | Yamane et al. | 340/994 |
| 2006/0064235 | A1* | 3/2006 | Ishikawa et al. | 701/117 |
| 2006/0206256 | A1* | 9/2006 | Kumagai et al. | 701/117 |
| 2007/0185643 | A1* | 8/2007 | Yamane et al. | 701/117 |
| 2007/0225894 | A1* | 9/2007 | Tsukamoto | 701/117 |
| 2008/0077316 | A1* | 3/2008 | Yamane et al. | 701/119 |
| 2008/0234922 | A1 | 9/2008 | Ishikawa et al. | |
| 2010/0138141 | A1* | 6/2010 | Hayashida et al. | 701/118 |
| 2011/0224898 | A1* | 9/2011 | Scofield et al. | 701/200 |
| 2011/0276257 | A1* | 11/2011 | Zaitsu et al. | 701/117 |
| 2012/0029801 | A1 | 2/2012 | Yano et al. | |

* cited by examiner

71

| LINK ID | MANAGEMENT NUMBER | TRAFFIC CONGESTION LEVEL | NUMBER OF TRAVELS | CONSUMPTION ENERGY |
|---|---|---|---|---|
| XX101 | 1 | HEAVY CONGESTION | 1 | 100 cc |
| | 2 | HEAVY CONGESTION | 2 | 150 cc |
| | 3 | NO CONGESTION | 1 | 60 cc |
| | 4 | HEAVY CONGESTION | 3 | 120 cc |
| YY105 | 1 | HEAVY CONGESTION | 1 | 110 cc |
| | 2 | HEAVY CONGESTION | 2 | 160 cc |
| | 3 | NO CONGESTION | 1 | 65 cc |
| | 4 | HEAVY CONGESTION | 3 | 130 cc |
| | 5 | NO CONGESTION | 2 | 55 cc |
| .... | .... | .... | .... | .... |

FIG. 4

72

| TRAFFIC CONGESTION LEVEL / ROAD TYPE | INTERURBAN EXPRESSWAY | URBAN EXPRESSWAY | ORDINARY ROAD |
|---|---|---|---|
| HEAVY CONGESTION | LOWER THAN 40 km/h | LOWER THAN 20 km/h | LOWER THAN 10 km/h |
| CONGESTION | 40 km/h OR HIGHER LOWER THAN 60 km/h | 20 km/h OR HIGHER LOWER THAN 40 km/h | 10 km/h OR HIGHER LOWER THAN 20 km/h |
| NO CONGESTION | 60 km/h OR HIGHER | 40 km/h OR HIGHER | 20 km/h OR HIGHER |

TRAFFIC INFORMATION CREATING DEVICE, TRAFFIC INFORMATION CREATING METHOD AND PROGRAM

INCORPORATION BY REFERENCE

The disclosure of Japanese Patent Application No. 2012-063212, filed on Mar. 21, 2012, including the specification, drawings, and abstract is incorporated herein by reference in its entirety.

BACKGROUND

1. Related Technical Fields

Related technical fields include traffic information creating devices, traffic information creating methods, and programs that create traffic information of a passage link.

2. Related Art

Various techniques for creating traffic information of a link have been suggested so far. There is a traffic situation computing system (for example, see Japanese Patent Application Publication No. 2008-234162 (JP 2008-234162 A)). The traffic situation computing system is configured as follows. For example, at the time of computing the traffic congestion levels of links on the basis of probe data collected from probe cars, the traffic congestion levels are detected by changing a set of thresholds for classifying the traffic congestion levels (heavy congestion, congestion, no congestion) by predetermined vehicle speeds, the detected traffic congestion levels are compared with traffic congestion levels based on traffic information in units of secondary mesh for a coincidence rate, and the set of thresholds having the highest coincidence rate are selected. Then, the traffic congestion levels of the respective links in an intended secondary mesh are computed on the basis of the selected set of thresholds and are stored.

SUMMARY

However, in the traffic situation computing system described in JP 2008-234162 A, the acquired traffic information is generated on the basis of a traffic situation a predetermined period of time before the time point at which the traffic information has been received. Therefore, when traffic information has been updated on the way of passage of a link, the accuracy of the traffic congestion level of a link that has been passed a predetermined distance behind a received location, at which current traffic information has been received, in a travel direction may decrease.

Exemplary implementations of the broad inventive principles described herein provide a traffic information creating device, traffic information creating method and program that are able to highly accurately determine a traffic congestion level of an exited link train on the basis of distributed traffic information and store the traffic congestion level of the exited link train.

Exemplary implementations provide devices, methods, and programs that access map information including link information related to links that constitute a road, acquire a current location of a vehicle at unit time intervals, and acquire traffic information, which includes a distributed traffic congestion level of each link and which is distributed from a device outside the vehicle at predetermined time intervals. Each time the vehicle exits a link, the devices, methods, and programs sequentially store the exited link in an exited link train on the basis of the map information and determine whether the traffic information has been received. When it is determined that the traffic information has been received, the devices, methods, and program store the distributed traffic congestion level included in the received traffic information as a traffic congestion level in association with a portion of the exited link train within a range from the current location at a received time point at which the traffic information has been received to a location that is a predetermined distance behind the current location at the received time point in a travel direction among the exited link train.

BRIEF DESCRIPTION OF THE DRAWINGS

FIG. 4 is a view that shows an example of a traffic congestion level computing table that is stored in the traffic information DB;

DETAILED DESCRIPTION OF THE EXEMPLARY IMPLEMENTATIONS

Hereinafter, an example in which the traffic information creating device, the traffic information creating method and the program are applied to a navigation system will be described in detail with reference to the accompanying drawings.

1. Schematic Configuration of Navigation System

Figure 1:
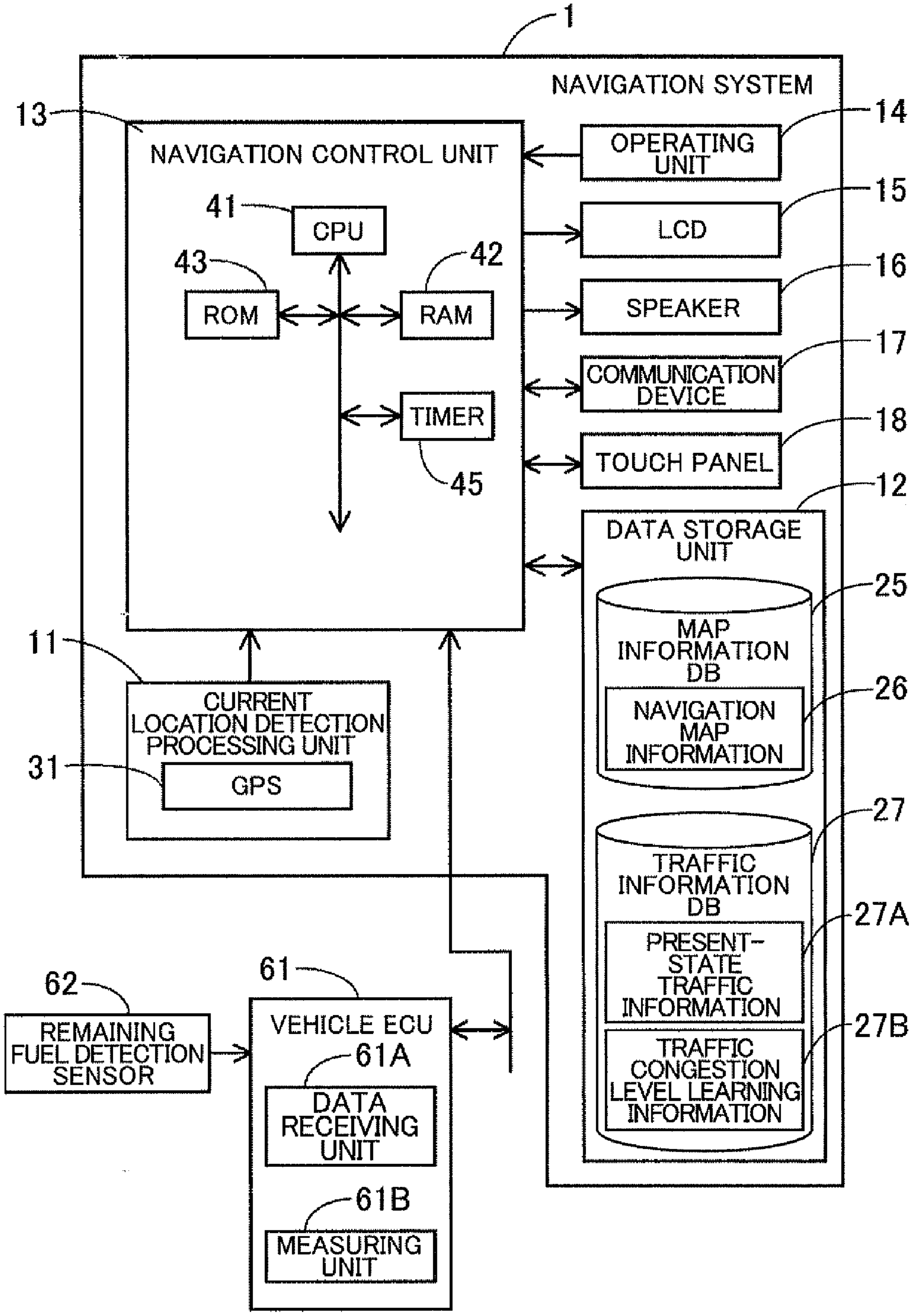
FIG. 1 is a block diagram that shows an example of the configuration of a navigation system according to an example.
Figures 2, 3:
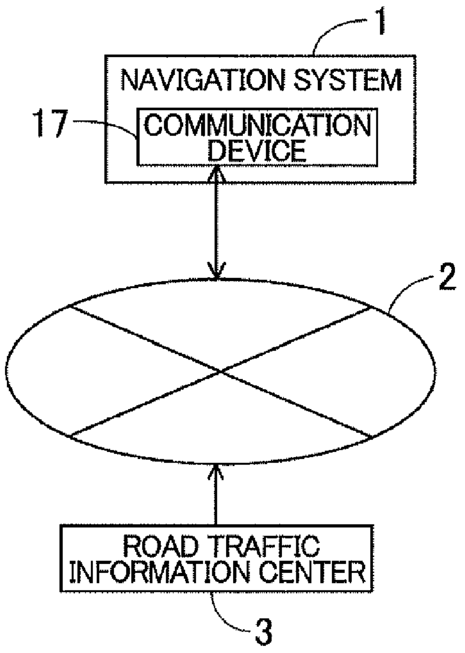
FIG. 2 is an explanatory view that illustrates communication between the navigation system and a road traffic information center.
FIG. 3 is a view that shows an example of a traffic congestion level learning table that is stored in traffic congestion level learning information of a traffic information DB.

First, the schematic configuration of the navigation system according to the present example will be described with reference to FIG. 1 and FIG. 2. FIG. 1 is a block diagram that shows the navigation system 1 according to the present example. FIG. 2 is an explanatory view that illustrates communication between the navigation system 1 and a road traffic information center 3.

As shown in FIG. 1, the navigation system 1 according to the present example is formed of a current location detection processing unit 11, a data storage unit 12, a controller (e.g., navigation control unit 13), an operating unit 14, a liquid crystal display (LCD) 15, a speaker 16, a communication device 17 and a touch panel 18. The current location detection processing unit 11 detects the current location, or the like, of a host vehicle. Various data are stored in the data storage unit 12. The navigation control unit 13 executes various types of arithmetic processing on the basis of input information. The operating unit 14 accepts operator's operation. The liquid crystal display (LCD) 15 shows information about a map, or the like, to the operator. The speaker 16 outputs voice guidance associated with a route guide, or the like. The communication device 17 communicates with the road traffic information center 3, a map information distribution center (not shown), or the like, via a mobile telephone network, or the like. The touch panel 18 is attached to the surface of the liquid crystal display 15.

In addition, a vehicle electronic control unit (ECU) 61 is electrically connected to the navigation control unit 13. The vehicle ECU 61 detects the remaining level of fuel with the use of a remaining fuel detection sensor 62. The vehicle ECU 61 includes a data receiving unit 61A and a measuring unit 61B. The data receiving unit 61A receives control information transmitted from the navigation control unit 13. The measuring unit 61B measures the remaining level of fuel with the use of the remaining fuel detection sensor 62 on the basis of the received control information, and then outputs the measured remaining level of fuel. By so doing, the navigation control unit 13 is able to measure a consumption of gasoline per unit travel distance by transmitting a control signal to the vehicle ECU 61.

In addition, as shown in FIG. 2, the road traffic information center 3 is connected to the navigation system 1 via a network 2. The road traffic information center 3 distributes traffic information and latest road information at predetermined time intervals (for example, intervals of five minutes). The traffic information is, for example, information such as traffic congestion of roads, which is created by collecting information from a traffic control system of the police, Japan Highway Public Corporation, or the like, and traffic regulation information. The latest road information includes VICS link IDs for identifying VICS (trademark) links associated with the respective pieces of traffic information. The network 2 may be a communication system, such as a mobile telephone network, a telephone network, a public communication line network, a leased line network and a communication line network, such as the Internet.

The navigation system 1 is configured to be able to receive the latest road information, distributed from the road traffic information center 3 via the network 2, at the predetermined time intervals (for example, intervals of five minutes). The traffic information that is included in the road information is, for example, detailed information about traffic information, such as road congestion information about the traffic congestion level of a road, or the like, and information on traffic regulation due to road work, construction work, or the like.

Roads (links) that are stored in navigation map information 26 are not the same as VICS links (generally, the roads (links) are more segmentalized than the VICS links). Therefore, a conversion table (cross-reference table) between a link ID assigned to each link as an identification number and a VICS link ID is stored in a map information DB 25, and it is possible to identify a corresponding link ID on the basis of a VICS link ID.

Hereinafter, component elements that constitute the navigation system 1 will be described. The current location detection processing unit 11 is formed of a GPS 31, and the like, and is able to detect a host vehicle location, a host vehicle direction, a travel distance, and the like. Note that a direction sensor (not shown), a distance sensor (not shown), and the like, may be connected to the current location detection processing unit 11.

The data storage unit 12 includes a hard disk (not shown), a flash memory (not shown), or the like, which serves as an external storage device and a storage medium, and also includes a driver (not shown) that is used to load the map information database (map information DB) 25, a traffic information database (traffic information DB) 27, predetermined programs, and the like, which are stored in the hard disk, or the like, and to write predetermined data to the hard disk, the flash memory, or the like.

The navigation map information 26 is stored in the map information DB 25. The navigation map information 26 is used in the navigation system 1 to guide a travel or search for a route. Present-state traffic information 27A that is information about a present state of traffic congestion, or the like, of a road is stored in the traffic information DB 27 each time traffic information is received from the road traffic information center 3. The present-state traffic information 27A is formed of the traffic congestion level, the actual length of traffic congestion, a required time, the cause of traffic congestion, expected time to free up traffic congestion, and the like, which constitute the received traffic information. Note that previous several pieces (for example, previous six pieces) of the present-state traffic information 27A are stored in the traffic information DB 27 together with respective dates of receipt, and are configured to be sequentially replaced with new traffic information each time traffic information is received from the road traffic information center 3.

A traffic congestion level learning table 71 (see FIG. 3) is stored in traffic congestion level learning information 27B of the traffic information DB 27. The traffic congestion level learning table 71 stores a traffic congestion level at the time when the vehicle has travelled each link, a fuel consumption at the time when the vehicle has travelled each link, and the like, in association with a link ID by which each link of the navigation map information 26 is identified. In addition, a traffic congestion level computing table 72 (see FIG. 4) is stored in the traffic information DB 27. The traffic congestion level computing table 72 stores traffic congestion levels and thresholds of the travel speeds of the vehicle, corresponding to the respective traffic congestion levels, for each road type.

The navigation map information 26 is formed of various pieces of information required to guide a route and display a map. The navigation map information 26 is, for example, formed of new road information, map display data, intersection data related to intersections, node data related to nodes, link data related to roads (links), search data, facility data, and retrieval data. The new road information is used to identify new roads. The map display data are used to display a map. The search data are used to search for a route. The facility data are related to point of interest (POI), such as a shop that is one of facilities. The retrieval data are used to retrieve a point.

For example, data about actual road branching points (including intersections, T-junctions, and the like), coordinates (positions) of nodes, node properties, connection link number lists, adjacent node number lists, and the like, are stored as the node data. The nodes are set on each road at an interval of a predetermined distance on the basis of a curvature radius, or the like. Each of the node properties, for example, indicates whether the node corresponds to an intersection. Each of the connection link number lists is a list of link IDs that are identification numbers of links that connect with the node. Each of the adjacent node number lists is a list of node numbers of nodes adjacent to each node via a link.

For example, data related to each link that constitutes a road, data related to a corner, data related to a road property, and data related to a road type are stored as the link data. The data related to each link indicate a link ID that identifies each link, a link length that indicates the length of each link, coordinate positions (for example, latitude and longitude) of the start point and end point of each link, presence or absence of a median strip, the width, gradient, cant, bank and road surface state of a road to which each link belongs, the number of lanes of the road, a point at which the number of lanes reduces, a point at which the width narrows, a crossing, and the like. The data related to a corner indicate a curvature radius, an intersection, a T-junction, an entrance and exit of the corner, and the like. The data related to a road property indicate a downhill, an uphill, and the like. The data related to a road type indicate not only an ordinary road, such as a national highway, a prefectural highway and a minor street, but also an interurban expressway, an urban expressway, and the like. The contents of the map information DB 25 are updated by downloading update information distributed from the map information distribution center (not shown) via the communication device 17.

As shown in FIG. 1, the navigation control unit 13 that constitutes the navigation system 1 includes a CPU 41, an internal storage device, a timer 45, and the like. The CPU 41 serves as a computing device and control device that comprehensively control the navigation system 1. The internal storage device is a RAM 42, a ROM 43, or the like. The RAM 42 is used as a working memory at the time when the CPU 41 executes various types of arithmetic processing. Route data, and the like, at the time when a route search has been made are stored in the RAM 42. Control programs, and the like, are stored in the ROM 43. The timer 45 measures a period of time. A program of a traffic congestion level storing process (see FIG. 5) is stored in the ROM 43. The traffic congestion level storing process stores a traffic congestion level of an exited link (described later) and a fuel consumption within the link in association with the link. (Note: the term "storage device" as used herein is not intended to encompass transitory signals.)

Various peripheral devices (actuators), that is, the operating unit 14, the liquid crystal display 15, the speaker 16, the communication device 17 and the touch panel 18, are electrically connected to the navigation control unit 13. The operating unit 14 is operated, for example, at the time when a start of travel is corrected and a current location at the time when a departure place that is a guide start point and a destination that is a guide end point are input or when information about a facility is retrieved. The operating unit 14 is formed of various keys and a plurality of operating switches. The navigation control unit 13 executes control for carrying out various operations on the basis of respective switch signals that are output by, for example, pressing down the switches.

Map information of an area in which the vehicle is currently travelling, map information of an area around a destination, an operation guide, an operation menu, a key guide, a recommended route from a current location to the destination, guide information along the recommended route, traffic information, news, weather forecast, time, mail, TV program, and the like, are displayed on the liquid crystal display 15.

The speaker 16 outputs voice guidance, or the like, that guides a travel along a recommended route on the basis of instructions from the navigation control unit 13. The voice guidance for a guide is, for example, "200 m ahead, turn right at □□ intersection."

The communication device 17 is a communication unit that uses a mobile telephone network, or the like, and that communicates with the road traffic information center 3, the map information distribution center (not shown), or the like. The communication device 17 receives latest traffic information distributed from the road traffic information center 3, and exchanges newest version updated map information, or the like, with the map information distribution center.

The touch panel 18 is a transparent panel-shaped touch switch attached onto the display screen of the liquid crystal display 15. The touch panel 18 is configured to be able to input various instruction commands by pressing down buttons or a map displayed on the screen of the liquid crystal display 15 and to be able to, when the display screen is pressed down with finger(s) and dragged, detect the moving direction and moving speed of each finger and detect the number of fingers with which the display screen is pressed down, for example. Note that the touch panel 18 may be formed of an optical sensor liquid crystal type, or the like, in which the screen of the liquid crystal display 15 is directly pressed down.

Next, an example of the traffic congestion level learning table 71 that is stored in the traffic congestion level learning information 27B of the traffic information DB 27 will be described with reference to FIG. 3. As shown in FIG. 3, the traffic congestion level learning table 71 is formed of "link ID," "management number," "traffic congestion level," "number of travels" and "consumption energy." The link IDs of the navigation map information 26 are stored as the "link ID."

A turn stored in association with each link ID is stored as the "management number." A traffic congestion level determined through the traffic congestion level storing process (see FIG. 5) and corresponding to each link ID is stored as the "traffic congestion level." The number of travels at each traffic congestion level is stored as the "number of travels." A fuel consumption at the time when the vehicle has travelled through the link is stored as the "consumption energy."

Note that, when the "number of travels" has reached a predetermined number of times (for example, "five" times) and then becomes the next number of travels (for example, "sixth" travel), data of which the "number of travels" at each traffic congestion level is the "first" travel are deleted, and then the "management number" and "number of travels" of each piece of data are decremented and stored. For example, data of the "second" to "fifth" travel are decremented to data of the "first" to "fourth" travel, and data of the "sixth" travel are stored as data of the "fifth" travel.

Next, an example of the traffic congestion level computing table 72 that is stored in the traffic information DB 27 will be described with reference to FIG. 4. As shown in FIG. 4, the traffic congestion level computing table 72 is formed of three types of traffic congestion levels, that is, "heavy congestion," "congestion" and "no congestion," and the thresholds of the travel speeds of the vehicle, corresponding to the respective traffic congestion levels. Furthermore, thresholds that vary on the basis of a road type (three types, that is, "interurban expressway," "urban expressway" and "ordinary road") are set as the thresholds of the travel speeds of the vehicle.

For example, when the road type is the "ordinary road," the threshold between the "heavy congestion" and the "congestion" is "10 km/h," and the threshold between the "congestion" and "no congestion" is "20 km/h." Thus, when the vehicle speed sensor 51 has detected that the vehicle has travelled along a link of an ordinary road at an average travel speed of "8 km/h," the traffic congestion level of that link is determined to be "heavy congestion."

2. Traffic Congestion Level Storing Process

Next, the traffic congestion level storing process will be described with reference to FIG. 5 to FIG. 9. The process algorithms in FIGS. 5-6B may be implemented in the form of one or more computer programs that are stored in, for example, a storage device included in the navigation system 1, and executed by the controller (e.g., navigation control unit 13). Although the structure of the above-described navigation device 1 is referenced in the description of the process, the reference to such structure is exemplary, and the process need not be limited by the specific structure of the navigation device 1.

Figure 5:
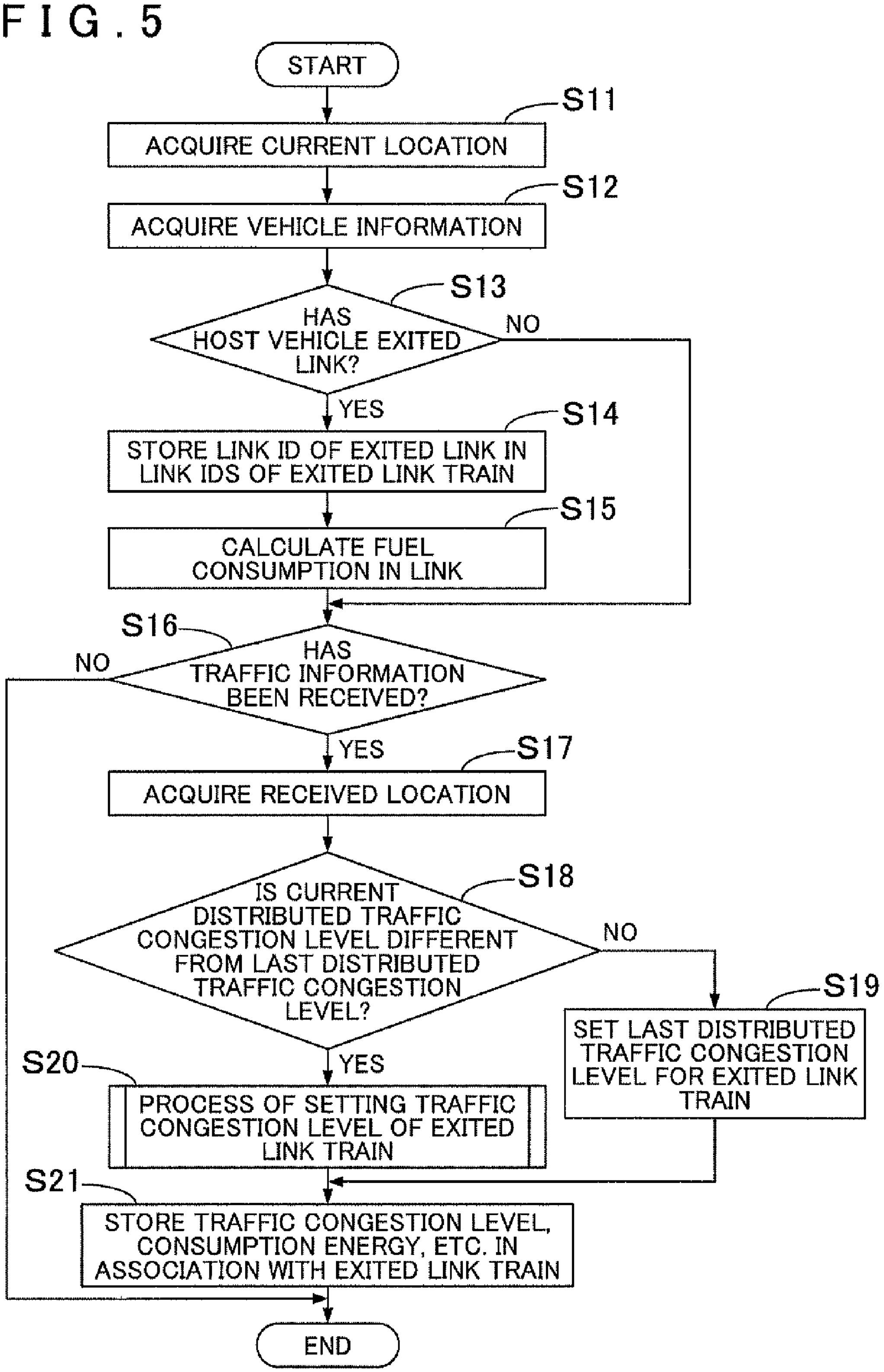
FIG. 5 is a main flowchart that shows a traffic congestion level storing process algorithm that stores a traffic congestion level of a travelled link in association with the link and that is executed by the navigation system.

A program shown by the flowchart in FIG. 5 may be executed by the CPU 41 at unit time intervals (for example, at intervals of one second). As shown in FIG. 5, first, in step (hereinafter, abbreviated as "S") 11, the CPU 41 detects the current location of the host vehicle (hereinafter, referred to as "host vehicle location") on the basis of the result detected by the current location detection processing unit 11 and stores the host vehicle location in the RAM 42.

In S12, the CPU 41 transmits a control signal to the vehicle ECU 61, acquires the remaining level of gasoline, detected by the remaining fuel detection sensor 62, and stores the remaining level of gasoline in the RAM 42. The CPU 41 calculates a fuel consumption by subtracting the current remaining level of gasoline from the last remaining level of gasoline, adds the calculated fuel consumption to the last fuel consumption, and stores the obtained fuel consumption in the RAM 42.

Subsequently, in S13, the CPU 41 loads the host vehicle location from the RAM 42, loads the "link ID" and "road type" of the currently travelling link and the "coordinate position of a forward travelling-side link end (end point)" from the navigation map information 26, and stores them in the RAM 42. The CPU 41 executes determination process of determining whether the host vehicle has passed through the link end (end point) of the currently travelling link, that is, whether the host vehicle has exited the link.

When it is determined that the host vehicle has not passed through the link end (end point) of the currently travelling link, that is, when it is determined that the host vehicle has not exited the link (NO in S13), the CPU 41 proceeds with the process to S16 (described later). On the other hand, when the host vehicle has passed through the link end (end point) of the currently travelling link, that is, when it is determined that the host vehicle has exited the link (YES in S13), the CPU 41 proceeds with the process to S14.

In S14, the CPU 41 loads the link ID of the exited link from the RAM 42, and stores the link ID of the exited link in the RAM 42 as the link IDs of an exited link train. In S15, the CPU 41 loads the fuel consumption stored in the RAM 42 in S12, and stores the fuel consumption in the RAM 42 again as the fuel consumption corresponding to the link ID of the exited link.

Subsequently, in S16, the CPU 41 executes determination process of determining whether traffic information has been received from the road traffic information center 3 via the communication device 17. When it is determined that traffic information has not been received from the road traffic information center 3 (NO in S16), the CPU 41 ends the process.

On the other hand, when it is determined that traffic information has been received from the road traffic information center 3 (YES in S16), the CPU 41 stores information related to present-state traffic congestion of the road, and the like, which is formed of a traffic congestion level, an actual length of traffic congestion, a required time, a cause of traffic congestion, expected time to free up traffic congestion, and the like, which constitute the traffic information, in the present-state traffic information 27A together with a date of receipt, and then proceeds with the process to S17. Note that, when the number of pieces of traffic information stored in the present-state traffic information 27A is larger than or equal to six, the CPU 41 deletes the piece of traffic information having the oldest date of receipt from the present-state traffic information 27A.

In S17, the CPU 41 loads the host vehicle location from the RAM 42, and stores the host vehicle location in the RAM 42 again as "received location (current location at the received time point)" at which traffic information has been received. Subsequently, in S18, the CPU 41 loads the "link ID" of the currently travelling link from the RAM 42, and loads the traffic congestion level (hereinafter, referred to as "distributed traffic congestion level") corresponding to the currently travelling link from each of the currently received traffic information and the previously received traffic information that are stored in the present-state traffic information 27A.

The CPU 41 stores the distributed traffic congestion level of the currently received traffic information (hereinafter, referred to as "current distributed traffic congestion level") and the distributed traffic congestion level of the previously received traffic information (hereinafter, referred to as "last distributed traffic congestion level"), loaded from the present-state traffic information 27A, in the RAM 42. The CPU 41 executes determination process of determining whether the "current distributed traffic congestion level" and the "last distributed traffic congestion level" are different from each other.

When it is determined that the "current distributed traffic congestion level" and the "last distributed traffic congestion level" are the same (NO in S18), the CPU 41 proceeds with the process to S19. In S19, the CPU 41 loads the link IDs of the exited link train from the RAM 42, stores the "last distributed traffic congestion level" in the RAM 42 as the traffic congestion level of the exited link train in association with all the link IDs of the exited link train, and then proceeds with the process to S21 (described later).

On the other hand, when it is determined that the "current distributed traffic congestion level" and the "last distributed traffic congestion level" are different from each other (YES in S18), the CPU 41 proceeds with the process to S20. In S20, the CPU 41 executes a sub-process (see FIGS. 6A and 6B), that is, a process of setting a traffic congestion level of the exited link train (described later), and then proceeds with the process to S21.

In S21, the CPU 41 sequentially loads the "link IDs" of the exited link train, the "last distributed traffic congestion level" or "current distributed traffic congestion level" associated with the "link IDs" and the "fuel consumption" associated with the "link IDs" from the RAM 42. The CPU 41 sets the "link IDs" of the exited link train, sequentially loaded from the RAM 42, as the "link IDs" of the traffic congestion level learning table 71, and stores the "last distributed traffic congestion level" or "current distributed traffic congestion level" associated with the "link IDs" in the corresponding "traffic congestion level" of the traffic congestion level learning table 71 as the "traffic congestion levels" of the link IDs.

The CPU 41 sets the "link IDs" of the exited link train, sequentially loaded from the RAM 42, as the "link IDs" of the traffic congestion level learning table 71, and stores the "fuel consumption" associated with the "link IDs" in the corresponding "consumption energy" of the traffic congestion level learning table 71. The CPU 41 stores a number that indicates a turn, at which data are stored, as the "management number" of the traffic congestion level learning table 71, corresponding to the "last distributed traffic congestion level" or "current distributed traffic congestion level," and stores a number that indicates a turn, at which the "last distributed traffic congestion level" or "current distributed traffic congestion level" is stored, as the "number of travels." After that, the CPU 41 ends the process.

A. Process of Setting Traffic Congestion Level of Exited Link Train

Figure 6A:
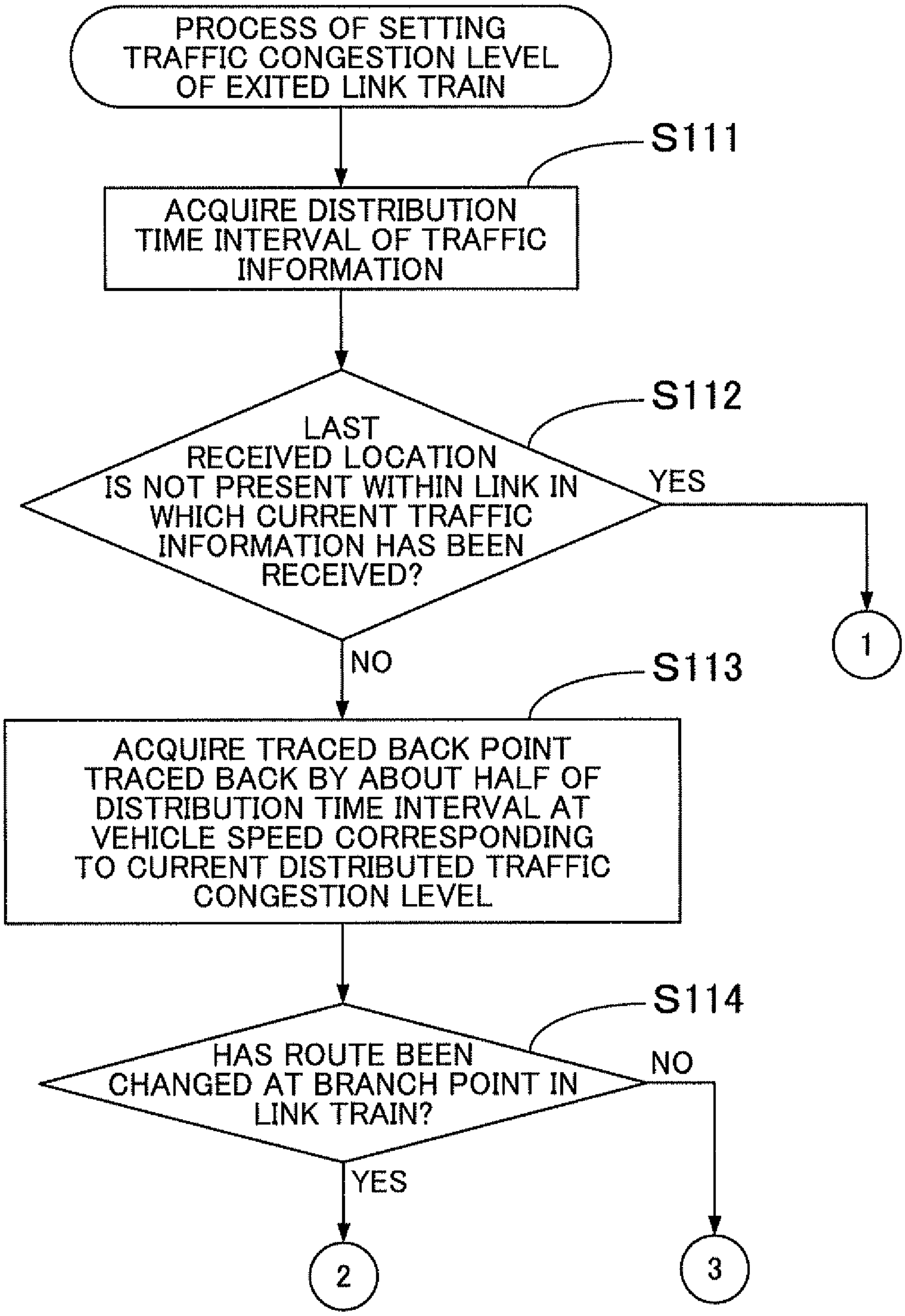
FIGS. 6A and 6B are a sub-flowchart that shows a sub-process algorithm of a process of setting a traffic congestion level of an exited link train, shown in FIG. 5.
Figure 6B:
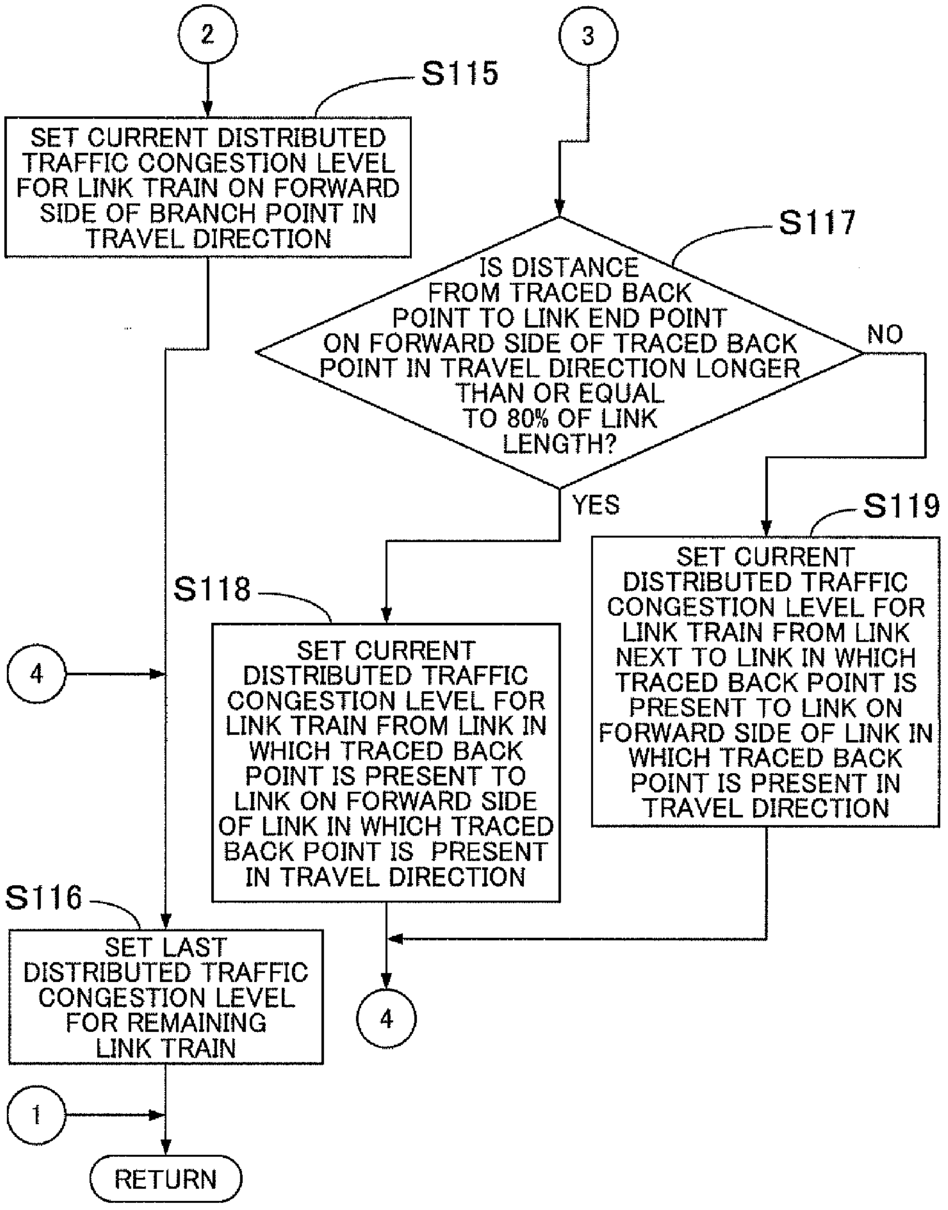

Next, the sub-process, that is, the process of setting a traffic congestion level of the exited link train, which is executed by the CPU 41 in S20, will be described with reference to FIGS. 6A and 6B to FIG. 8. As shown in FIGS. 6A and 6B, first, in S111, the CPU 41 loads, from the ROM 43, a distribution time interval (for example, an interval of about five minutes) at which traffic information is distributed from the road traffic information center 3. Note that the distribution time interval at which traffic information is distributed from the road traffic information center 3 is prestored in the ROM 43.

Subsequently, in S112, the CPU 41 executes determination process of determining whether the "received location" at which the last traffic information has been received is not present within the link in which the current traffic information has been received. Specifically, the CPU 41 loads the "received location" at which the last traffic information has been received from the RAM 42. The CPU 41 loads the host vehicle location from the RAM 42, identifies the currently travelling link from the navigation map information 26, and loads the start point, end point and shape interpolation point of the currently travelling link. The CPU 41 executes determination process of determining whether the "received location" at which the last traffic information has been received is not present in a line that connects the start point, end point and shape interpolation point of the currently travelling link or within a predetermined radius (for example, a radius of about 3 m) from the line.

When it is determined that the "received location" at which the last traffic information has been received is present within the link in which the current traffic information has been received (YES in S112), the CPU 41 ends the sub-process, after which the CPU 41 returns to the main flowchart and proceeds with the process to S21. Note that the exited link train is not stored because the last traffic information and the current traffic information have been received within the same link, and thus the CPU 41 ends the process without executing the process of S21.

On the other hand, when it is determined that the "received location" at which the last traffic information has been received is not present within the link at which the current traffic information has been received (NO in S112), the CPU 41 proceeds with the process to S113. In S113, the CPU 41 loads the "current distributed traffic congestion level" and the "road type" of the currently travelling link, acquired in S13, from the RAM 42, and loads the threshold of the travel speed for the "current distributed traffic congestion level," corresponding to the "road type" of the currently travelling link, from the traffic congestion level computing table 72.

The CPU 41 obtains a distance by multiplying the threshold of the travel speed for the "current distributed traffic congestion level" by about half (for example, about 2.5 minutes) of the distribution time interval at which traffic information is distributed from the road traffic information center 3, and stores the distance in the RAM 42 as a "traced back distance." The CPU 41 loads the host vehicle location and the link IDs of the exited link train from the RAM 42, loads a coordinate position (for example, latitude and longitude) of a "traced back point," to which the exited link train is traced back from the host vehicle location by the "traced back distance" in the travel direction, from the navigation map information 26, and stores the loaded "traced back point" in the RAM 42 as the coordinate position of the "traced back point" in the exited link train.

Subsequently, in S114, the CPU 41 loads, from the navigation map information 26, the end points of the links between the host vehicle location and the "traced back point" in the exited link train, to which the exited link train is traced back from the host vehicle location by the "traced back distance" in the travel direction. The CPU 41 executes determination process of determining whether there is a branch point, such as an interchange, at which a route has been changed (for example, a change of a route from an interurban expressway to an ordinary road or a change of a route from an urban expressway to an interurban expressway) among the end points of the links. That is, the CPU 41 executes determination process of determining whether a route has been changed at a branch point, such as an interchange, while the vehicle travels from the "traced back point" in the exited link train to the host vehicle location.

When it is determined that there is a "branch point," such as an interchange, at which a route has been changed, among the end points of the links between the host vehicle location and the "traced back point" in the exited link train, to which the exited link train is traced back from the host vehicle location by the "traced back distance" in the travel direction (YES in S114), the CPU 41 proceeds with the process to S115. In S115, the CPU 41 loads the link IDs of the exited link train from the RAM 42, extracts the link IDs of the exited link train on the forward side of the "branch point" in the travel direction, at which the route has been changed, from the navigation map information 26 and stores the link IDs in the RAM 42.

The CPU 41 loads the "current distributed traffic congestion level" and the link IDs of the exited link train on the forward side of the "branch point" in the travel direction, at which the route has been changed, from the RAM 42, and stores the "current distributed traffic congestion level" in the RAM 42 as the traffic congestion level of the exited link train on the forward side of the "branch point" in the travel direction, at which the route has been changed, in association with the link IDs of the exited link train on the forward side of the "branch point" in the travel direction.

Subsequently, in S116, the CPU 41 extracts the link IDs of the exited link train, with which the "current distributed traffic congestion level" is not associated as the traffic congestion level, among all the link IDs of the exited link train, and stores those link IDs in the RAM 42 as the link IDs of the remaining exited link train. The CPU 41 stores the "last distributed traffic congestion level" in the RAM 42 in association with the link IDs of the remaining exited link train. After that, the CPU 41 ends the sub-process, returns to the main flowchart, and proceeds with the process to S21.

An example in which the traffic congestion level of an exited link train is set in the case where there is the "branch point," such as an interchange, at which a route has been changed, among the end points of the links between the host vehicle location and the "traced back point" in the exited link train, to which the exited link train is traced back from the host vehicle location by the "traced back distance" in the travel direction will be described with reference to FIG. 7.

Figure 7:
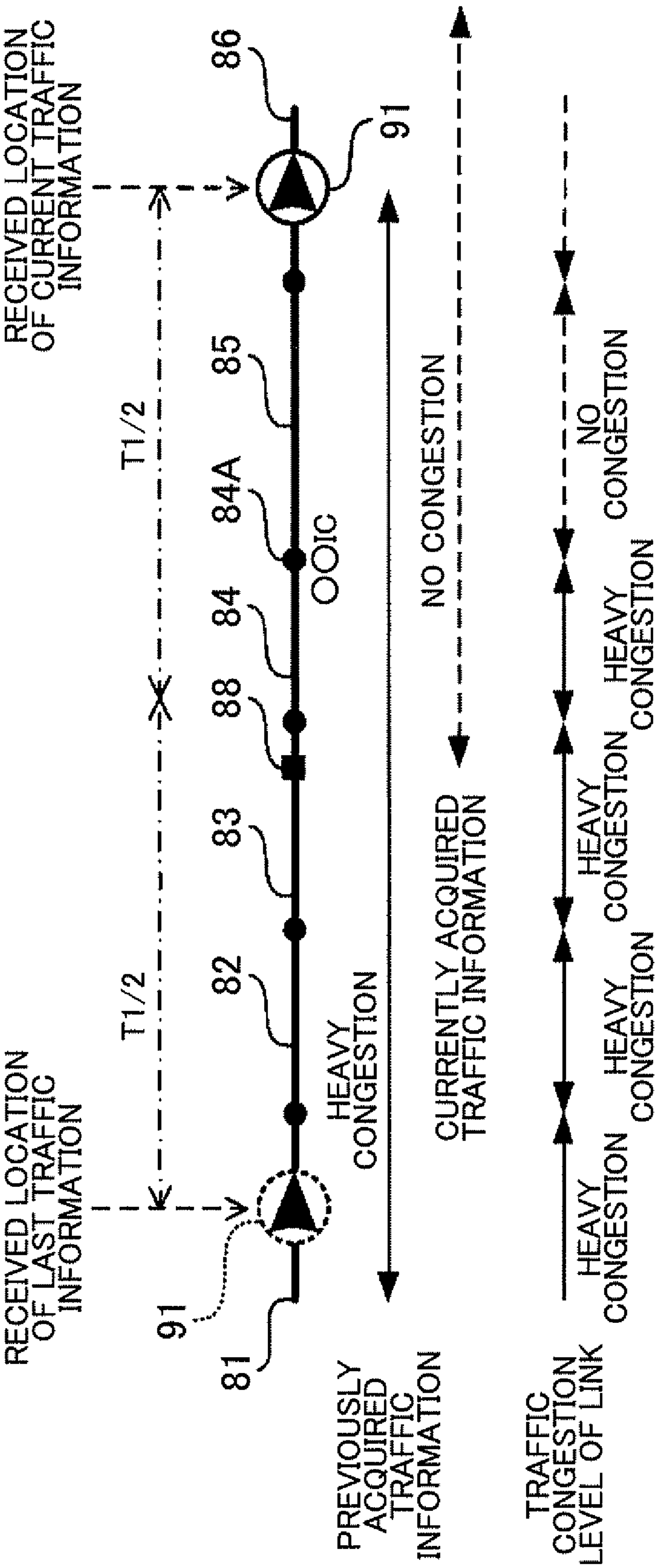
FIG. 7 is a view that shows an example in which a traffic congestion level of an exited link train is set in the case where a route has been changed at a branch point.

For example, as shown in FIG. 7, the "last distributed traffic congestion level" loaded from the present-state traffic information 27A is "heavy congestion," the "current distributed traffic congestion level" is "no congestion," and the link train from which a host vehicle 91 has exited from when last traffic information has been received to when current traffic information is received includes links 81 to 85. The host vehicle location is currently present in a link 86. In addition, the host vehicle 91 enters from the link 84 of an ordinary road into the link 85 of an interurban expressway at a branch point 84A of "□□ interchange (IC)" to change a route.

The road type of the link 86 is "interurban expressway," and the "current distributed traffic congestion level" is "no congestion," so the CPU 41 loads the threshold of the travel speed "60 km/h" for the traffic congestion level "no congestion" from the traffic congestion level computing table 72, and calculates a "traced back distance" (for example, about 2.5 km) by multiplying T½ (for example, about two and half minutes) that is about half of the distribution time interval of traffic information. The CPU 41 loads the coordinate position of a "traced back point 88," to which the exited link train of the links 81 to 85 is traced back from the host vehicle location by the "traced back distance" in the travel direction, from the navigation map information 26, and stores the coordinate position of the "traced back point 88" in the RAM 42.

Thus, as shown in FIG. 7, in this case, there is the "branch point 84A" at which a route has been changed between the host vehicle location and the traced back point 88" in the exited link train, to which the exited link train is traced back from the host vehicle location by the "traced back distance" in the travel direction, and thus the CPU 41 loads the link ID of the link 85 from the RAM 42, among the links 81 to 85 in the exited link train, on the forward side of the "branch point 84A" in the travel direction, at which the route has been changed.

The CPU 41 stores the traffic congestion level "no congestion" that is the "current distributed traffic congestion level" in the RAM 42 in association with the link ID of the link 85. The CPU 41 stores the traffic congestion level "heavy congestion" that is the "last distributed traffic congestion level" in the RAM 42 in association with the link IDs of the remaining links 81 to 84 among the links 81 to 85 of the exited link train. After that, the CPU 41 proceeds with the process to S21, and executes the process of S21.

On the other hand, in S114, when it is determined that there is no "branch point," such as an interchange" at which a route has been changed, among the end points of the links between the host vehicle location and the "traced back point" in the exited link train, to which the exited link train is traced back from the host vehicle location by the "traced back distance" in the travel direction (NO in S114), the CPU 41 proceeds with the process to S117.

In S117, the CPU 41 loads the coordinate position of the "traced back point" from the RAM 42, loads the start point, end point, shape interpolation point and link length of the link, in which the "traced back point" is present, from the navigation map information 26, and stores them in the RAM 42. The CPU 41 calculates a distance from the "traced back point" to the end point of the link on the forward side of the "traced back point" in the travel direction, and executes determination process of determining whether the distance is 80% or above the link length of the link in which the "traced back point" is present. Note that the determination distance is not limited to 80% or above the link length; it may be set to any rate of the link length, which is, for example, 65% or above to 95% or above.

When it is determined that the distance from the "traced back point" to the end point of the link on the forward side of the "traced back point" in the travel direction is longer than or equal to 80% of the link length of the link in which the "traced back point" is present (YES in S117), the CPU 41 proceeds with the process to S118. In S118, the CPU 41 loads the link IDs of the exited link train from the RAM 42, extracts the link IDs of the exited link train from the link in which the "traced back point" is present to the link on the forward side of the link in which the "traced back point" is present in the travel direction from the navigation map information 26, and stores the extracted link IDs in the RAM 42.

The CPU 41 loads the "current distributed traffic congestion level" and the link IDs of the exited link train from the link in which the "traced back point" is present to the link on the forward side of the link in which the "traced back point" is present in the travel direction from the RAM 42. The CPU 41 sets the "current distributed traffic congestion level" as the traffic congestion level of the exited link train from the link in which the "traced back point" is present to the link on the forward side of the link in which the "traced back point" is present in the travel direction, and stores the "current distributed traffic congestion level" in the RAM 42 in association with the link IDs of the exited link train from the link in which the "traced back point" is present to the link on the forward side of the link in which the "traced back point" is present in the travel direction. After that, the CPU 41 proceeds with the process to S116, executes the process of S116, after which the CPU 41 ends the sub-process, returns to the main flowchart, and proceeds with the process to S21.

On the other hand, when it is determined that the distance from the "traced back point" to the end point of the link on the forward side of the "traced back point" in the travel direction is shorter than 80% of the link length of the link in which the "traced back point" is present (NO in S117), the CPU 41 proceeds with the process to S119. In S119, the CPU 41 loads the link IDs of the exited link train from the RAM 42, extracts the link IDs of the exited link train from the link next to the link in which the "traced back point" is present in the travel direction to the link on the forward side of the link in which the "traced back point" is present, from the navigation map information 26, and stores the extracted link IDs in the RAM 42.

The CPU 41 loads the "current distributed traffic congestion level" and the link IDs of the exited link train from the link next to the link which the "traced back point" is present in the travel direction to the link on the forward side of the link in which the "traced back point" is present, from the RAM 42. The CPU 41 sets the "current distributed traffic congestion level" as the traffic congestion level of the exited link train from the link next to the link which the "traced back point" is present in the travel direction to the link on the forward side of the link in which the "traced back point" is present, and stores the "current distributed traffic congestion level" in the RAM 42 in association with the link IDs of the exited link train from the link next to the link which the "traced back point" is present in the travel direction to the link on the forward side of the link in which the "traced back point" is present. After that, the CPU 41 proceeds with the process to S116, executes the process of S116, after which the CPU 41 ends the sub-process, returns to the main flowchart, and proceeds with the process to S21.

An example in which the traffic congestion level of an exited link train is set in the case where there is no "branch point," such as an interchange, at which a route has been changed, among the end points of the links between the host vehicle location and the "traced back point" in the exited link train, to which the exited link train is traced back from the host vehicle location by the "traced back distance" in the travel direction will be described with reference to FIG. 8.

Figure 8:
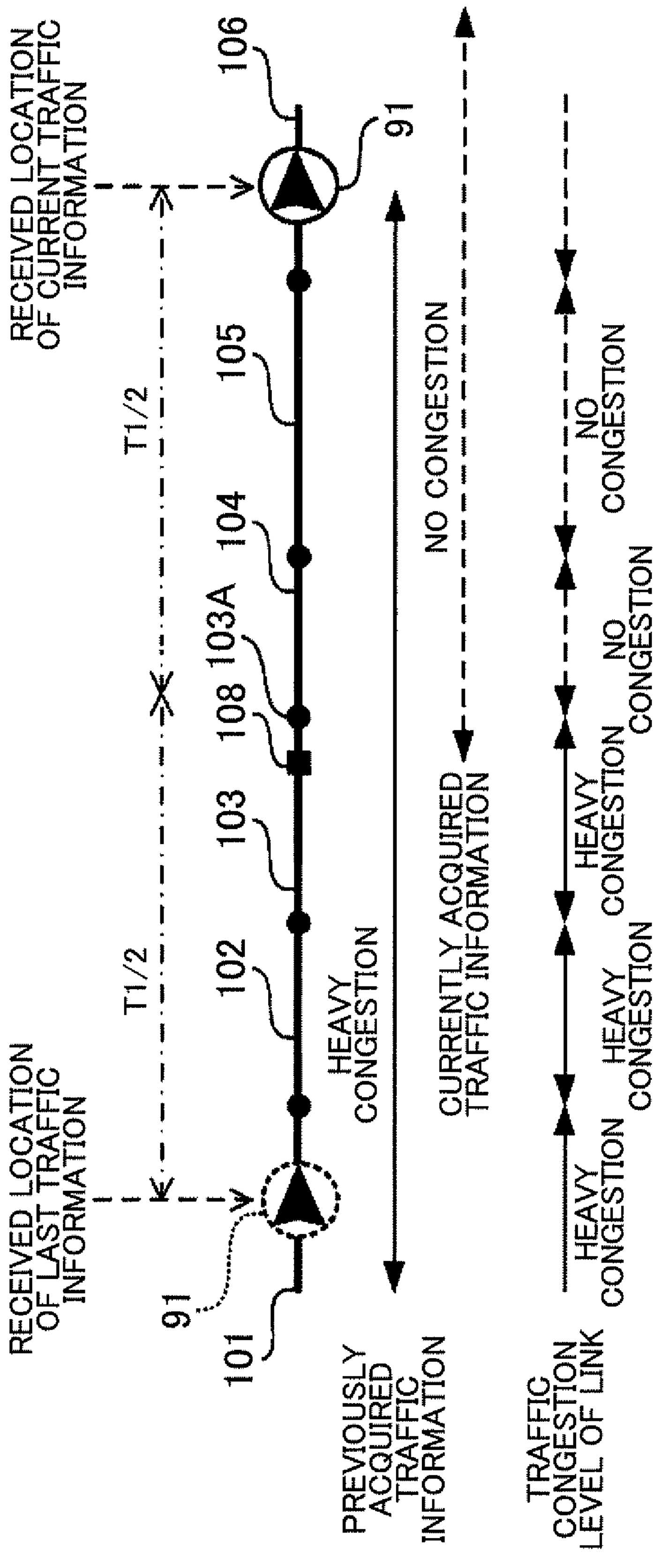
FIG. 8 is a view that shows an example in which a traffic congestion level of an exited link train is set in the case where a route has not been changed at a branch point.

For example, as shown in FIG. 8, the "last distributed traffic congestion level" loaded from the present-state traffic information 27A is "heavy congestion," the "current distributed traffic congestion level" is "no congestion," and the link train from which the host vehicle 91 has exited from when last traffic information has been received to when current traffic information is received includes links 101 to 105 of an ordinary road. The host vehicle location is currently located in a link 106 of an ordinary road. A route has not been changed at the end points of the links 101 to 105 of the exited link train.

The road type of the link 106 is "ordinary road," and the "current distributed traffic congestion level" is "no congestion," so the CPU 41 loads the threshold of the travel speed "20 km/h" for the traffic congestion level "no congestion" from the traffic congestion level computing table 72, and calculates a "traced back distance" (for example, about 830 m) by multiplying T½ (for example, about two and half minutes) that is about half of the distribution time interval of traffic information. The CPU 41 loads the coordinate position of a "traced back point 108," to which the exited link train of the links 101 to 105 is traced back from the host vehicle location by the "traced back distance" in the travel direction, from the navigation map information 26, and stores the coordinate position of the "traced back point 108" in the RAM 42.

The CPU 41 loads the link length of the link 103 from the navigation map information 26, and calculates the distance from the "traced back point 108" to an end point 103A, which is on the forward side of the "traced back point 108" in the travel direction, in the link 103 in which the "traced back point 108" is present. The CPU 41 calculates the rate of the distance with respect to the link length of the link 103 by dividing the distance by the link length of the link 103.

Thus, as shown in FIG. 8, when the rate of the distance from the "traced back point 108" to the end point 103A, which is on the forward side of the "traced back point 108," in the link 103 with respect to the link length of the link 103 is smaller than 80%, the CPU 41 stores the link IDs of the links 104 and 105, which are links from the link 104 next to the link 103 in which the "traced back point 108" is present in the travel direction to the link 105 of the exited link train on the forward side of the "traced back point 108" in the travel direction, in the RAM 42.

The CPU 41 stores the traffic congestion level "no congestion" that is the "current distributed traffic congestion level" in the RAM 42 in association with the link IDs of the links 104 and 105. The CPU 41 stores the traffic congestion level "heavy congestion" that is the "last distributed traffic congestion level" in the RAM 42 in association with the link IDs of the remaining links 101 to 103 among the links 101 to 105 of the exited link train. After that, the CPU 41 proceeds with the process to S21, and executes the process of S21.

As described above, in the navigation system 1 according to the present example, when traffic information has been received, the CPU 41 stores the distance, obtained by multiplying about half of the distribution time interval, at which traffic information is distributed from the road traffic information center 3, by the threshold of the travel speed for the "current distributed traffic congestion level" in the RAM 42 as the "traced back distance."

Subsequently, when there is no "branch point," such as an interchange, at which a route has been changed among the end points of the links between the host vehicle location and the "traced back point" in the exited link train, to which the exited link train is traced back from the host vehicle location by the "traced back distance" in the travel direction, the CPU 41 calculates the distance from the "traced back point" to the end point of the link on the forward side of the "traced back point" in the travel direction and determines whether the distance is longer than or equal to 80% of the link length of the link in which the "traced back point" is present.

When it is determined that the distance from the "traced back point" to the end point of the link on the forward side of the "traced back point" in the travel direction is longer than or equal to 80% of the link length of the link in which the "traced back point" is present, the CPU 41 sets the "current distributed traffic congestion level" as the traffic congestion level of the links that constitute the exited link train from the link in which the "traced back point" is present to the link on the forward side of the link in which "the traced back point" is present in the travel direction. On the other hand, when it is determined that the distance from the "traced back point" to the end point of the link on the forward side of the "traced back point" in the travel direction is shorter than 80% of the link length of the link in which the "traced back point" is present, the CPU 41 sets the "current distributed traffic congestion level" as the traffic congestion level of the links that constitute the exited link train from the link next to the link in which the "traced back point" is present in the travel direction to the link on the forward side of the link in which the "traced back point" is present.

By so doing, the CPU 41 is able to set the "current distributed traffic congestion level" for the exited link train between the received location at which traffic information has been received and the "traced back point" to which the exited link train is traced back from the received location by the "traced back distance" among the exited link train from the received location of the last traffic information to the received location of the current traffic information, so it is possible to highly accurately set the traffic congestion level of the exited link train.

When there is a "branch point," such as an interchange, at which a route has been changed among the end points of the links between the host vehicle location and the "traced back point" in the exited link train, to which the exited link train is traced back from the host vehicle location by the "traced back distance" in the travel direction, the CPU 41 sets the "current distributed traffic congestion level" as the traffic congestion level of the links that constitute the exited link train on the forward side of the "branch point" in the travel direction, at which the route has been changed.

By so doing, it is possible to set the "current distributed traffic congestion level" for the exited link train on the forward side of the "branch point" in the travel direction, at which the route has been changed, among the exited link train from the received location of the last traffic information to the received location of the current traffic information, so it is possible to highly accurately set the traffic congestion level of each of the links that constitute the exited link train.

Furthermore, the CPU 41 sets the "last distributed traffic congestion level" for the links that constitute the remaining link train, for which the "current distributed traffic congestion level" is not set, among the exited link train from the received location of the last traffic information to the received location of the current traffic information. By so doing, it is possible to further highly accurately set the traffic congestion level of the exited link train.

3. Modifications

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, after the process of S113 has been executed, the process may proceed to S117 and may not execute the processes of S114 and S115. By so doing, it is possible to speed up processing.

4. Advantages

According to the above examples, when it is determined that the traffic information has been received, the distributed traffic congestion level included in the received traffic information is stored as a traffic congestion level in association with a portion of the exited link train within the range from the current location at the received time point to the location that is the predetermined distance behind the current location at the received time point in the travel direction among the exited link train. By so doing, it is possible to highly accurately determine the traffic congestion level of a portion of the exited link train within the range from the current location at the received time point at which the distributed traffic information has been received to the location that is the predetermined distance behind the current location at the received time point in the travel direction and store the traffic congestion level of the portion of the exited link train.

According to the above examples, the predetermined distance is determined on the basis of a vehicle speed corresponding to the distributed traffic congestion level of the link in which the current location is present at the received time point and substantially half of each of the predetermined time intervals at which the traffic information is distributed. By so doing, it is possible to further highly accurately identify a portion of the exited link train within the range from the current location at the received time point to the location that is the predetermined distance behind the current location at the received time point in the travel direction in association with the distributed traffic congestion level of the received traffic information among the exited link train.

According to the above examples, only the links from the current location at the received time point to the branch point, such as an interchange, at which a route has been changed are set at the distributed traffic congestion level of the received traffic information and are stored. By so doing, it is possible to further highly accurately determine the traffic congestion level of a portion of the exited link train within the range from the received location of the distributed traffic information to the location that is the predetermined distance behind the received location of the distributed traffic information in the travel direction and store the traffic congestion level of the portion of the exited link train.

What is claimed is:

1. A traffic information creating device comprising:

a memory that stores map information including link information related to links that constitute a road; and a controller that:

acquires a current location of a vehicle at unit time intervals;

acquires current traffic information, which includes a distributed current traffic congestion level of each link and which is distributed from a device outside the vehicle at predetermined time intervals;

each time the vehicle exits a link, sequentially stores the exited link in an exited link train on the basis of the map information;

determines whether the current traffic information has been acquired; and when it is determined that the current traffic information has been acquired:

determine whether the current traffic information indicates a congestion level that is different from a congestion level of traffic information that was acquired by the controller just prior the current traffic information;

if the current traffic information indicates a congestion level that is the same as the congestion level of the traffic information that was acquired by the controller just prior the current traffic information, set the congestion level of the traffic information that was acquired by the controller just prior the current traffic information as the congestion level for the exited link train; and if the current traffic information indicates a congestion level that is different than the congestion level of the traffic information that was acquired by the controller just prior the current traffic information, stores in the memory, the distributed current traffic congestion level included in the received current traffic information as a traffic congestion level in association with a portion of the exited link train within a range from the current location at a received time point at which the current traffic information has been received to a location that is a predetermined distance behind the current location at the received time point in a travel direction among the exited link train.

2. The traffic information creating device according to claim 1, wherein the controller:

determines the predetermined distance on the basis of a vehicle speed corresponding to the distributed current traffic congestion level of a link in which the current location is present at the received time point and substantially half of each of the predetermined time intervals.

3. The traffic information creating device according to claim 1, wherein the controller:

determines whether there is a branch point at which a route has been changed among end points of links of the exited link train within the range from the current location at the received time point to the location that is the predetermined distance behind the current location at the received time point in the travel direction; and when there is a branch point at which a route has been changed among the end points of the links of the exited link train within the range from the current location at the received time point to the location that is the predetermined distance behind the current location at the received time point in the travel direction, stores the distributed current traffic congestion level included in the received current traffic information as a traffic congestion level in association with the exited link train from the current location at the received time point to the branch point.

4. The traffic information creating device according to claim 1, wherein the controller:

calculates a fuel consumption for the exited link; and when it is determined that the current traffic information has been received, stores the calculated fuel consumption as a consumption energy in association with a portion of the exited link train within a range from the current location at a received time point at which the current traffic information has been received to a location that is a predetermined distance behind the current location at the received time point in a travel direction among the exited link train.

5. A traffic information creating method comprising:

accessing, with a processor, stored map information including link information related to links that constitute a road;

acquiring, with the processor, a current location of a vehicle at unit time intervals;

acquiring, with the processor, current traffic information, which includes a distributed current traffic congestion level of each link and which is distributed from a device outside the vehicle at predetermined time intervals;

each time the vehicle exits a link, sequentially storing, the processor, the exited link in an exited link train on the basis of the map information;

determining, with the processor, whether the current traffic information has been acquired; and when it is determined that the traffic information has been acquired:

determining, with the processor, whether the current traffic information indicates a congestion level that is different from a congestion level of traffic information that was acquired just prior the current traffic information;

if the current traffic information indicates a congestion level that is the same as the congestion level of the traffic information that was acquired just prior the current traffic information, setting, with the processor, the congestion level of the traffic information that was acquired just prior the current traffic information as the congestion level for the exited link train; and if the current traffic information indicates a congestion level that is different than the congestion level of the traffic information that was acquired just prior the current traffic information, storing in the memory, with the processor, the distributed current traffic congestion level included in the received current traffic information as a traffic congestion level in association with a portion of the exited link train within a range from the current location at a received time point at which the current traffic information has been received to a location that is a predetermined distance behind the current location at the received time point in a travel direction among the exited link train.

6. The traffic information creating method according to claim 5, further comprising:

determining, with the processor, the predetermined distance on the basis of a vehicle speed corresponding to the distributed current traffic congestion level of a link in which the current location is present at the received time point and substantially half of each of the predetermined time intervals.

7. The traffic information creating method according to claim 5, further comprising:

determining, with the processor, whether there is a branch point at which a route has been changed among end points of links of the exited link train within the range from the current location at the received time point to the location that is the predetermined distance behind the current location at the received time point in the travel direction; and when there is a branch point at which a route has been changed among the end points of the links of the exited link train within the range from the current location at the received time point to the location that is the predetermined distance behind the current location at the received time point in the travel direction, storing, with the processor, the distributed current traffic congestion level included in the received current traffic information as a traffic congestion level in association with the exited link train from the current location at the received time point to the branch point.

8. The traffic information creating method according to claim 5, further comprising:

calculating, with the processor, a fuel consumption for the exited link; and when it is determined that the current traffic information has been received, storing, with the processor, the calculated fuel consumption as a consumption energy in association with a portion of the exited link train within a range from the current location at a received time point at which the current traffic information has been received to a location that is a predetermined distance behind the current location at the received time point in a travel direction among the exited link train.

9. A non-transitory computer-readable storage device storing a computer-executable program usable to create traffic information, the program comprising:

instructions for accessing stored map information including link information related to links that constitute a road;

instructions for acquiring a current location of a vehicle at unit time intervals;

instructions for acquiring current traffic information, which includes a distributed current traffic congestion level of each link and which is distributed from a device outside the vehicle at predetermined time intervals;

instructions for, each time the vehicle exits a link, sequentially storing the exited link in an exited link train on the basis of the map information;

instructions for determining whether the current traffic information has been acquired; and instructions for, when it is determined that the current traffic information has been acquired:

determining whether the current traffic information indicates a congestion level that is different from a congestion level of traffic information that was acquired just prior the current traffic information;

if the current traffic information indicates a congestion level that is the same as the congestion level of the traffic information that was acquired just prior the current traffic information, setting the congestion level of the traffic information that was acquired just prior the current traffic information as the congestion level for the exited link train; and if the current traffic information indicates a congestion level that is different than the congestion level of the traffic information that was acquired just prior the current traffic information, storing in the memory, the distributed current traffic congestion level included in the received current traffic information as a traffic congestion level in association with a portion of the exited link train within a range from the current location at a received time point at which the current traffic information has been received to a location that is a predetermined distance behind the current location at the received time point in a travel direction among the exited link train.

10. The non-transitory computer-readable storage device according to claim 9, the program further comprising:

instructions for determining the predetermined distance on the basis of a vehicle speed corresponding to the distributed current traffic congestion level of a link in which the current location is present at the received time point and substantially half of each of the predetermined time intervals.

11. The non-transitory computer-readable storage device according to claim 9, the program further comprising:

instructions for determining whether there is a branch point at which a route has been changed among end points of links of the exited link train within the range from the current location at the received time point to the location that is the predetermined distance behind the current location at the received time point in the travel direction; and instructions for, when there is a branch point at which a route has been changed among the end points of the links of the exited link train within the range from the current location at the received time point to the location that is the predetermined distance behind the current location at the received time point in the travel direction, storing the distributed current traffic congestion level included in the received current traffic information as a traffic congestion level in association with the exited link train from the current location at the received time point to the branch point.

12. The non-transitory computer-readable storage device according to claim 9, the program further comprising:

instructions for calculating a fuel consumption for the exited link; and instructions for, when it is determined that the current traffic information has been received, storing the calculated fuel consumption as a consumption energy in association with a portion of the exited link train within a range from the current location at a received time point at which the current traffic information has been received to a location that is a predetermined distance behind the current location at the received time point in a travel direction among the exited link train.

* * * * *